United States Patent Office 3,341,483
Patented Sept. 12, 1967

3,341,483
ANIONIC GRAFT POLYMERIZATION OF VINYL MONOMERS ON NATURAL POLYHYDROXY COMPOUNDS, THEIR DERIVATIVES AND ON SYNTHETIC POLYHYDROXY POLYMERS
Albert Zilkha, Ben-Ami Feit, and Akiva Bar-Nun, Jerusalem, Israel, assignors to Yissum Research Development Company, Hebrew University, Jerusalem, Israel, a company of Israel
No Drawing. Filed July 26, 1962, Ser. No. 243,176
Claims priority, application Israel, Aug. 30, 1961, 15,962
9 Claims. (Cl. 260—17)

This invention relates to the preparation of graft polymers of vinyl monomers such as, acrylonitriles, methylmethacrylate, vinyl sulphonate, nitroethylene, nitropropylene, acraldehyde, vinylidene cyanide, etc., which can be polymerized by anionic initiators, on polyhydroxy natural compounds such as cellulose, starch, cotton, lignin etc., their derivatives and modified forms, and on synthetic polymers having, or capable of being converted to polymers having free hydroxyl groups such as, polyvinyl alcohol, polyvinyl esters etc.

The method of obtaining these graft polymers is based on a new method of graft polymerization which consists of converting hydroxyl groups of the polymer backbone into alkoxide groups and a subsequent anionic graft polymerization of the vinyl monomers by the alkoxide anions of the polymers. Up till now no method of anionic graft polymerization has been known. (G. Smets and R. Hart, "Block and Grafted Copolymers," Fortschr. Hochpolym. Forsch. 2, 173–220 (1960); H. F. Mark, and E. H. Imergut, Proceedings of Cellulose Conference Syracuse, pp. 2–14 (1958).)

Graft polymers of the general structure

are known to have special properties depending on the structure of the backbone (A), and the attached side chains (B).

Some preliminary work on the grafting of cellulose, cellulose acetate, starch and polyvinyl alcohol has been carried out by free radical polymerizations including radiation (J. J. Hermans et al. J. Appl. Polymer Sci. III, 259 (1960); K. Gal et al. Vysokmol. Soedinenya 2, 576 (1960); A. Mishina, J. Agric. Chem. Soc. Japan 35, 40 (1961)), ozonization (T. Borunsky, Canad. Patent 549, 110 (1957)), redox polymerization (G. Mino, S. Keizerman, J. Polymer Sci., 31, 242 (1958)) and mechanical fission of the polymers (R. J. Ceresa, Polymer 2, 213 (1961)).

However these methods have great disadvantages such as difficulty in control of the extent of the graft polymerization or the site of the grafting on the parent polymer backbone, and these difficulties would be more pronounced if these reactions were performed on a large scale. Also the grafting is restricted only to vinyl monomers capable of undergoing free radical polymerization. Other important vinyl monomers such as, nitro-olefins, vinylidene cyanide etc., which are polymerized only by anionic initiators, but not by free radicals, could not be grafted by such methods.

We have shown in previous extensive studies (A. Zilkha, B. A. Feit and M. Frankel, Proc. Chem. Soc. 255, (1958); J. Chem. Soc., 928 (1959); J. Appl. Polymer Sci. 251 (1961)) that vinyl monomers are polymerized by alkali metal alkoxides of various alcohols. We have now found that it is possible to use the alkoxide derivatives of the natural and synthetic polyhdroxy polymers and their derivatives such as, hydroxyalkyl cellulose, as initiators of anionic polymerization of vinyl monomers, thus obtaining graft polymers of the following general formula:

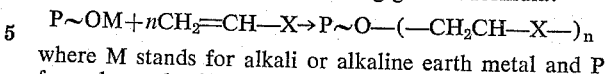

where M stands for alkali or alkaline earth metal and P for polymer having hydroxyl groups.

Polymers having ester groups can be converted completely or partially to polyhydroxy polymers by reduction. Formation of alkoxides of these polymers will then permit grafting. Thus polyvinylacetate, for example, is reduced by sodium in liquid ammonia to give directly the alkoxide of the alcohol:

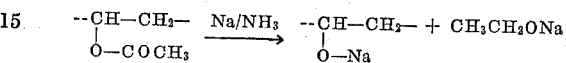

In the same way cellulose acetate is reduced,

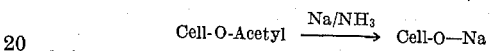

Cell stands for cellulose.

These reductions can also be carried out by the well known Bouveault-Blanc reduction by alkali metals and alcohol. Also certain polyethers, especially aromatic, are cleaved by sodium in liquid ammonia to give the alkoxide (Audrieth and Kleinberg, "Non-Aqueous Solvents," Wiley & Sons, New York, 1953, p. 111):

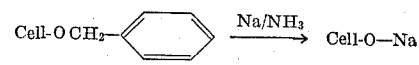

These reductions can be carried out partially so that part of the ether or ester groups are retained, and a graft polymer of a vinyl monomer on cellulose, esters or ethers is obtained.

The preparation of alkoxides of polyhydroxy natural polymers such as, starch, cellulose, etc., which are used as the initiators of graft polymerization has been extensively studied. The reaction between concentrated alkali metal hydroxide solutions and cellulose has been shown to give alkoxides of known alkoxide content and structure (G. Chapetier and O. Yovanovitch, J. Chim. Phys. 48, 587 (1951); S. Bleshinsku and S. Lozitskaya, Trudy Khim. Inst. Kirgiz Filial Akad Nauk SSSR No. 4, 73 (1951); K. M. Gavar, E. P. Lasure and D. V. Tieszen, U.S. 2,572,-923 Oct. 30, 1951). The preparation is also simply carried out by alkali metal in liquid ammonia, which latter can be directly used as solvent for the graft polymerization. Liquid ammonia also in the presence of sodium or ammonium thiocyanate dissolves cellulose so that the polymerization can be carried out on cellulose in solution which cannot be done by other methods.

The present invention of anionic graft polymerization by alkali alkoxide derivatives of polymers provides the following advantages in the control of the graft polymerization:

(1) Control of the number of polymeric side chains per monomer unit of the parent polymer. In the case of cellulose starch etc., for example, which are polymers made up of glucose units each having three free hydroxyl groups at positions 2, 3 and 6, all or part of these groups can be converted into alkoxides. Thus it is possible to build up one to three graft polymer chains on every glucose unit. For example, we obtained graft polymers of acrylonitrile on cellulose containing about 90% by weight of polyacrylonitrile. It is also known that by addition of one mole sodium metal to cellulose in liquid ammonia, it is possible to convert exclusively the hydroxyl group in the 6 position of the glucose to an alkoxide. A graft polymer initiated by the alkoxide in the 6 position is expected to have different properties from a graft polymer in which the grafted side chain is at another position on the glucose. Also the alkoxide concentration per polymeric cellulose unit can of course be made to suit any amount of grafting required.

(2) Control of the length of side chains: (a) We have found (A. Zilkha and B. A. Feit, J. Appl. Polymer Sci. 251 (1961), that the molecular weight of polyacrylonitrile polymerized by alcoholic solutions of alcoholates is given by the equation, Molecular Weight=K. [Monomer Concentration]/[Alcohol Conc.], where K is a constant. By making use of this relationship it is possible to control the molecular weight of the grafted side chains. (b) The molceular weight of the grafted polymer side chains can be controlled by change in the temperature of the graft polymerization. It is known that decrease of reaction temperature increases the molecular weight of vinyl polymers such as polyacrylonitrile obtained by anionic catalysts. (c) Solvents, whether polar or non-polar are known to control the molecular weight by affecting the rates of the propagation and termination of the polymerization, which in turn control the molecular weight in accordance with the relationship: DP (degree of polymerization)= $Rp/Rt$, where $Rp$ and $Rt$ are the rates of propagation and termination respectively. (d) The alkoxide derivatives of different alkali or alkaline earth metals can be prepared. Since it is known that the electropositivity of the metal affects the rate of the polymerization, the molecular weight and the structure of the side chains, it is possible to control the length of the grafted side chains by using different alkali metal alkoxides (W. E. Goode, W. H. Snyder and R. C. Fettes, J. Polymer Sci. 42, 367 (1960).

(3) The alkoxide derivatives of the hydroxy polymers can generally be kept for a relatively long period of time ready for graft polymerization. This is in contradistinction to all the known methods using free radical initiation, since the active free radicals are extremely unstable and are only transitory.

(4) Strong acidic monomers such as nitroethylene and vinylidene cyanide can be graft polymerized by this anionic method although free radical initiators cannot polymerize them.

(5) Polymerization is very fast and can be carried out even at very low temperatures, since the activation energy needed for anionic polymerizations is very much smaller than that for free radical polymerizations.

One of the convenient procedures for the preparation of the metal alkoxide derivatives of the polyhydroxy polymers and the subsequent graft polymerization according to this invention consisted of suspending or dissolving the polyhydroxy polymer in anhydrous liquid ammonia in which the temperature can be maintained at —30° C. downwards by suitable exterior cooling. To this the desired quantity of alkali or alkaline earth metal is added in small portions. This gives a blue solution of the alkali metal in liquid ammonia. The colour disappears as the metal reacts with the hydroxyl groups to form alkoxides; or as it reduces the ester groups, in the case of polyesters, to give alkoxides. The vinyl monomer is then introduced either in one portion or dropwise over a period of a few hours with strong stirring. Polymerization occurs instantaneously. The graft polymer is recovered after evaporating the ammonia. It is purified by suitable treatment, as can be seen from the following examples:

Cellulose-polyacrylonitrile graft polymer is purified by washing with cold dilute hydrochloric acid followed by drying of the polymer and extraction of any free polyacrylonitrile formed by vacuum extraction with dimethylformamide in which it is soluble in a Soxhlet apparatus, The graft polymer is then freed from any unreacted cellulose by extraction with cuprammonium solution (Schweizer's reagent) which dissolves cellulose. The remaining polymer is a graft polymer free from both acrylonitrile homopolymer and cellulose. The percentage of grafted polyacrylonitrile is calculated from nitrogen analyses of the polymer.

Cellulose-polymethylmethacrylate graft polymer is freed after neutralization of the residual alkali with hydrochloric acid, from any homopolymer of methylmethacrylate by extraction with benzene. Any reisdual cellulose is extracted with cuprammonium solution. The percentage of grafted polymethylmethacrylate is calculated from methoxyl analyses of the ester groups.

Cellulose acetate-polyacrylonitrile graft polymer is freed from any unreacted cellulose acetate by extraction with benzene; extraction with dimethylformamide removes homopolymer of acrylonitrile and extraction with cuprammonium solution removes any cellulose formed. The percentage of grafted polyacrylonitrile is calculated from nitrogen analyses of the polymer.

Hydroxyethyl cellulose-polyacrylonitrile graft polymer is freed from unreacted hydroxyethyl cellulose by washing with water. Free polyacrylonitrile is then extracted with dimethylformamide leaving behind the graft polymer. The percentage of grafted polyacrylonitrile is calculated from nitrogen analysis of the polymer.

Polyvinylacetate-polyacrylonitrile graft polymer is extracted with benzene to remove any residual polyvinyl acetate, then with dimethylformamide to remove free polyacrylonitrile. The percentage of grafted polyacrylonitrile is calculated from nitrogen analyses of the polymer.

Polyvinylalcohol-polyacrylonitrile graft polymer is extracted with hot dimethylformamide, until no more extract passes over. This dissolves unreacted polyvinyl alcohol as well as polyacrylonitrile. The percentage of grafted polyacrylonitrile is calculated from nitrogen analyses of the polymer.

The properties of the graft polymers may be modified as required by reacting the functional groups of the polymer side chains with suitable reagents. As examples we may mention reactions on the cellulose-polyacrylonitrile graft polymer. The cyano groups can be hydrolyzed either partially or completely to carboxyl groups, or can be reduced to amino groups etc. It is of course possible to carry out many secondary reactions. Thus on heating a graft polymer of cellulose-polyacrylonitrile in dilute alkali, a soluble polymer having free carboxyl groups was obtained. This polymer can be used as cation exchange resin or as a thickening agent. The aldehyde groups of the cellulose-polyacraldehyde graft polymer can be reduced to the corresponding alcohol groups whereby the graft polymers are rendered water soluble. The aldehyde groups may also be oxidized to acid groups or they may be reacted with cyanide in the well known Strecker reaction to give polyelectrolytes having amino acid groups.

Cellulose-polyacrylonitrile graft polymer is soluble in concentrated solutions of inorganic salts such as zinc chloride and can be precipitated from these solutions by dilution with water; spinning of fibers from such concentrated solutions is possible.

Specific embodiments of this invention are described in the following examples. These examples are merely illustrative, however, and should not be considered as implying any limitation in the scope.

*Example 1.—Graft polymerization of acrylonitrile on cellulose*

Alphacel type cellulose powder (produced by the Nutritional Biochemicals Corp., U.S.A.) containing 99.9% α-cellulose was used. It was purified by refluxing 30 g. in 150 ml. ethanol for 5 hours, filtering and further refluxing in ether for 5 hours more. The purified cellulose is dried in an oven at 100–105° C. for 24 hours, then kept in vacuum over phosphorus pentoxide. Acrylonitrile monomer was purified by successive washings with 5% sulphuric acid, 5% sodium carbonate and water. It was dried over calcium chloride overnight, and fractionally distilled before use. Schweizer's reagent was prepared by the addition of sodium hydroxide solution to a dilute solution of copper sulphate with strong stirring until a heavy blue precipitate formed. The precipitate of cupric hydroxide was filtered and washed with water to neutrality. It was dissolved in concentrated ammonia, the amount of ammonia being just sufficient to dissolve it. The solution was filtered on glass wool and kept in the dark in brown bottles. Dry dimethylformamide and oxygen-free nitrogen were used. The polymerization vessel consisting of a three-necked flask equipped with a high speed stirrer, a separatory funnel for introducing acrylonitrile and a soda-lime guard tube is cooled to a low temperature (−78° C.) and 200 ml. of dry liquid ammonia are introduced into the flask. 10 g. alphacel powder are dispersed in the liquid ammonia. Potassium metal (5.72 g.) equivalent to 2.37 moles per mole of glucose are added in portions. A deep blue colored solution of the alkali metal in liquid ammonia is formed. The blue color disappears slowly as the potassium reacts with the cellulose to form the alkoxide derivative. After the complete disappearance of the blue color, 20 g. acrylonitrile monomer are added dropwise during 4 hours with strong stirring. The ammonia is then left to evaporate and the brown-yellow residue is ground to a fine powder (80 mesh) and dried in vacuo over phosphorus pentoxide. The yield of the dry product is 38 g. It is freed from the metal and bound ammonia by washing with ice cold dilute hydrochloric acid, filtering and washing with distilled water until neutral, and then with methanol. It is dried in vacuum over phosphorus pentoxide giving 29.6 g. (99% yield). The dried metal and ammonia-free product is then extracted with dimethylformamide in a Soxhlet apparatus in vacuo (98° C./40–50 mm.) under anhydrous conditions. 10.1 g. of the product (which is 34%) consisting of homopolyacrylonitrile and very low graft polymers (containing 23.8% nitrogen) dissolved in the dimethylformamide. The insoluble material 19.5 g. (66%) has 12.6% nitrogen corresponding to 47.7% grafted acrylonitrile. This product is repeatedly stirred in cuprammonium solution (Schweizer's reagent) until all free cellulose dissolved. The undissolved residue is acidified with ice cold dilute hydrochloric acid, filtered, washed with cold distilled water until neutral and then with methanol and dried in vacuo over phosphorus pentoxide. 10.5 g. (53.6%) remained after extraction with cuprammonium solution containing 22.9% nitrogen. This residue is the graft polymer of acrylonitrile on cellulose. It contains 87% grafted polyacrylonitrile. The dissolved portion (9.1 g., 46.4%) contains 1.1% nitrogen. It consists of pure cellulose and a small proportion of graft polymers, very low in acrylonitrile.

*Example 2.—Graft polymerization of acrylonitrile on cellulose in light petroleum*

Alphacel (10 g.) are dispersed with strong stirring in 200 ml. liquid ammonium and potassium metal 4.82 g. (2 mole equivalents) are added to form the alkoxide as described in Example 1. After the complete disappearance of the blue color, the liquid ammonia is evaporated, under anhydrous conditions with strong stirring. 180 ml. dry light petroleum (B.P. 40–60° C.) are then added, the reaction mixture cooled to −78° C. and 8 g. acrylonitrile monomer are added in one portion. The reaction mixture is stirred for 90 min. after the addition of monomer. The light petroleum is evaporated and the residue is purified as described in Example 1. The yield after neutralization is 17.1 g. (95%). After extraction with dimethylformamide 12 g. (70%) remained undissolved. Of this 0.85 g. remained after extraction with cuprammonium solution. This graft polymer contains 16.1% nitrogen, corresponding to 61% grafted polyacrylonitrile.

*Example 3.—Graft polymerization of methylmethacrylate on cellulose*

Alphacel (10 g.) are dispersed in 200 ml. liquid ammonia and cooled to −78° C. Potassium metal (5.72 g.) is then added in portions with stirring as described in Example 1. Methylmethacrylate monomer (23.5 g.) is then added in one portion and stirring is continued for 30 min., the ammonia is evaporated, the residue ground to a fine power (80 mesh) and dried over phosphorus pentoxide in vacuo. It is neutralized, washed and dried as described in Example 1; the yield is 29.6 g. (87%). The substance is then extracted with benzene in a Soxhlet apparatus. The undissolved residue is washed with benzene and dried. It weighed 8.5 g. (29%), and contained 3.2% methoxyl groups corresponding to 10.3% grafted polymethylmethacrylate. The fraction that dissolved in benzene contained 27.5% methoxyl groups, corresponding to polymethylmethacrylate and low graft polymers. The residue that is insoluble in benzene is extracted with cuprammonium solution. The yield of insoluble residue which is the graft polymer was 0.44 g. (5.2%) having 13.4% methoxyl groups, corresponding to 43.2% grafted polymethylmethacrylate.

*Example 4.—Graft polymerization of acrylonitrile on polyvinyl alcohol*

5 g. polyvinyl alcohol are dispersed in 250 ml. liquid ammonia with strong stirring, 0.5 g. sodium metal is introduced in portions. After all the sodium has reacted, 8 g. acrylonitrile are added dropwise during 20 minutes and stirred further for 30 minutes. The residue after evaporation of the ammonia is ground to a fine powder and dried. It is then treated with acetic acid to remove the alkali metal and bound ammonia. The dry residue (12 g., 92%) is subjected to an extraction in a Soxhlet apparatus with dimethylformamide. Both the homopolyacrylonitrile and the non-grafted polyvinyl alcohol pass into the extract. The yield of the remaining undissolved residue is 8.85 g. (74%); its nitrogen content is 14.4% corresponding to 60% grafted polyacrylonitrile in the graft polymer.

*Example 5.—Graft polymerization of acrylonitrile on hydroxyethyl cellulose*

5 g. (0.02 mole) hydroxyethyl cellulose "Cellosize" of molecular weight 250 was dried in vacuo over phosphorus pentoxide and introduced into the polymerization vessel containing 250 ml. liquid ammonia and cooled to −50° C. 0.46 g. (0.02 mole) sodium metal is then added. The blue color disappears after 15 minutes stirring as the alkoxide of the hydroxyethyl cellulose is formed. Acrylonitrile monomer (12 g.) is then added dropwise during 30 minutes. The yield of the yellow-red product after drying thoroughly in vacuo is 17.9 g. (100%). It is neutralized with dilute hydrochloric acid followed by washing with distilled water, to remove unreacted hydroxyethyl cellulose which is water soluble. The residue is dried and then extracted with dimethylformamide. The undissolved material which is the graft polymer is washed with acetone and dried in vacuo at 60° C. It contains 14.3% nitrogen corresponding to 54% grafted polyacrylonitrile.

*Example 6.—Graft polymerization of acrylonitrile on polyvinyl acetate*

5 g. polyvinyl acetate are dissolved in 200 ml. liquid ammonia at −60° C. 0.5 g. metallic sodium is added in portions. After all the sodium has reacted, 8 g. acrylonitrile are added dropwise during 20 minutes. The reaction mixture is evaporated to dryness and the residue is neutralized with dilute acetic acid and filtered, yield 13 g. It is extracted with benzene and then with dimethyl formamide, the residue which is the graft polymer weighs 3.5 g. containing 18.8% nitrogen. This is equivalent to 72% grafted polyacrylonitrile.

*Example 7.—Graft polymerization of acrylonitrile on cellulose acetate*

10 g. cellulose acetate are dissolved with strong stirring in 250 ml. liquid ammonia at −78° C. 2.1 g. potassium metal are added in portions. The solution of the potassium in the liquid ammonia proceeds with difficulty due to the concentrated solution of cellulose acetate. A white precipitate (cellulose alkoxide) starts to form in the liquid ammonia. 0.5 g. potassium metal is dissolved separately in 50 ml. liquid ammonia and this solution is siphoned into the reaction mixture. The blue color of the potassium is immediately discharged as the potassium reacts with the cellulose acetate. The reaction mixture is stirred for 30 minutes and 20 g. acrylonitrile are added dropwise during 120 minutes at −78° C. The ammonia is then left to evaporate. The residue is ground to a fine powder (80 mesh), and is dried in a vacuum desiccator. It is neutralized with ice cold dilute hydrochloric acid and dried over concentrated sulphuric acid in vacuo, yield 21.9 g. This is extracted with dimethylformamide. The fraction soluble in dimethylformamide (16.4 g.) contains 24.4% nitrogen, and is therefore substantially pure polyacrylonitrile. The insoluble fraction (5.5 g.) contains 7% nitrogen which corresponds to 27% grafted polyacrylonitrile.

*Example 8.—Graft polymerization of acrylonitrile on cellulose in solution*

75 g. dry sodium thiocyanate are dissolved in 300 ml. liquid ammonia at −78° C. To the resulting solution 1.9 g. cellulose are added and the solution stirred until all the cellulose is dissolved. Since sodium metal is insoluble in concentrated salt solutions in ammonia, a solution of 0.31 g. sodium metal was prepared in 150 ml. liquid ammonia in another flask and was siphoned to the reaction flask under anhydrous conditions. The color of the sodium metal in the liquid ammonia disappeared after 5 minutes, and the solution becomes very viscous. After 30 minutes stirring, 16 g. acrylonitrile are added carefully in one portion. The reaction mixture is stirred until all the ammonia is evaporated. 150 ml. water are added to the residue, and nearly all the material is dissolved, since homopolyacrylonitrile, cellulose and graft polymer are soluble in concentrated aqueous salt solutions. Addition of more water and acidification brings about precipitation. The precipitate is filtered and washed with water and dried in vacuo. The yield of material free of sodium thiocyanate is 15.4 g. This material is extracted with dimethylformamide to give 2.9 g. of insoluble residue containing 9.2% nitrogen equivalent to 35.4% grafted polyacrylonitrile. The soluble fraction contained 24.4% nitrogen and is nearly pure polyacrylonitrile. The residue is extracted with cuprammonium solution to remove free cellulose. 0.97 g. of graft polymer is obtained containing 20.6% nitrogen equivalent to 80% grafted polyacrylonitrile.

Having now particularly described and ascertained the nature of our said invention, and in what manner the same is to be performed, we declare that what we claim is:

1. A process for preparing graft copolymers, which comprises reacting ethylenically unsaturated monomers under anhydrous conditions with an alkali metal or alkaline earth metal alkoxide derivative of a member of the group consisting of cellulose, hydroxyethyl cellulose, hydroxypropyl cellulose, cellulose acetate, cellulose propionate, cellulose acetate-butyrate, cellulose nitrate, methyl cellulose, ethyl cellulose, starch, lignin, dextrin polysaccharides, polyvinyl alcohol, polyvinyl acetate, polyvinyl butyral and polyvinyl formal.

2. The process of claim 1 in which the ethylenically unsaturated monomer is selected from the group consisting of acrylonitrile, methacrylonitrile, methyl acrylate, methyl methacrylate, nitro ethylene, α-methyl nitroethylene, acrolein, methacrolein, methyl vinyl sulfonate, ethyl vinyl sulfonate, methyl vinyl phosphonate, ethyl vinyl phosphonate, vinylidene cyanide, and vinyl pyridine.

3. The process of claim 1 wherein the graft polymerization is conducted in a solvent selected from the group consisting of liquid ammonia, tetrahydrofuran, dimethyl formamide, dimethyl sulfoxide, and light petroleum fractions.

4. The process of claim 1 in which acrylonitrile is reacted with the alkoxide derivative of cellulose.

5. The process of claim 1 in which acrylonitrile is reacted with the alkoxide derivative of polyvinyl alcohol.

6. The process of claim 1 in which acrylonitrile is reacted with the alkoxide derivative of hydroxyethyl cellulose.

7. The process of claim 1 in which acrylonitrile is reacted with the alkoxide derivative of polyvinyl acetate.

8. The process of claim 1 in which acrylonitrile is reacted with the alkoxide derivative of cellulose acetate.

9. The process of claim 1 in which said alkoxide is an alkali metal alkoxide.

References Cited

UNITED STATES PATENTS 2,994,634   8/1961   Jayne _____ 260—231

FOREIGN PATENTS 592,210   9/1947   Great Britain.

WILLIAM H. SHORT, *Primary Examiner.*

LEON J. BERCOVITZ, *Examiner.*

J. J. NORRIS, *Assistant Examiner.*